United States Patent [19]

Sung et al.

[11] Patent Number: 6,090,504

[45] Date of Patent: Jul. 18, 2000

[54] HIGH CAPACITY COMPOSITE ELECTRODE AND SECONDARY CELL THEREFROM

[75] Inventors: Hyun Kyung Sung, Taejeon; Hyun Jung Kim, Kimhae; Kwanyoung Lee; Hosull Lee, both of Taejeon, all of Rep. of Korea

[73] Assignee: Korea Kumho Petrochemical Co., Ltd., Seoul, Rep. of Korea

[21] Appl. No.: 09/149,432

[22] Filed: Sep. 8, 1998

[30] Foreign Application Priority Data

Sep. 24, 1997 [KR] Rep. of Korea ............... 97-48475
Mar. 17, 1998 [KR] Rep. of Korea ............... 98-8917

[51] Int. Cl.$^7$ .................................................. H01M 4/60
[52] U.S. Cl. ................. 429/213; 429/218.1; 429/231.8; 429/322
[58] Field of Search ................. 429/213, 218.1, 429/231.8, 322

[56] References Cited

U.S. PATENT DOCUMENTS

| | | | |
|---|---|---|---|
| 4,833,048 | 5/1989 | Dejonghe et al. | 429/104 |
| 5,324,599 | 6/1994 | Oyama et al. | 429/192 |
| 5,516,598 | 5/1996 | Visco et al. | 429/42 |
| 5,573,871 | 11/1996 | Von Benda | 429/103 |
| 5,665,492 | 9/1997 | Sotomura | 429/213 |
| 5,869,206 | 2/1999 | Sotomura | 429/218.1 |

FOREIGN PATENT DOCUMENTS 0 797 264 A2   9/1997   European Pat. Off. .

OTHER PUBLICATIONS

Oyama, et al., *Nature*, 373:6515, pp. 598–600, Feb. 16, 1995.

Oyama et al. "Disulphide–Polyaniline Composite Cathodes For Rechargeable Batteries High Energy Density". Macromolecular Symposia vol. 105, Mar. 1996, pp. 85–90.

*Primary Examiner*—Laura Weiner
*Attorney, Agent, or Firm*—Kenyon & Kenyon

[57] ABSTRACT

The present invention relates to an improved secondary battery having high weight energy density and good reversibility, more specifically, a battery containing i) a positive electrode comprising a reversible positive electrode material containing an organosulfur compound wherein sulfur-sulfur bond is formed upon oxidation and sulfur-sulfur bond is cleaved upon electrolytic reduction, an electroactive component selected from main group elements compound, electrically conductive ingredients and a current collector containing copper metal; ii) a polymer electrolyte having lithium salt; and iii) a negative electrode made of lithium metal, lithium alloy or lithium intercalating carbon.

6 Claims, 5 Drawing Sheets

HIGH CAPACITY COMPOSITE ELECTRODE AND SECONDARY CELL THEREFROM

BACKGROUND OF THE INVENTION

1. Field of the Invention

The present invention relates to an electrode having high capacity and good reversibility, and a secondary battery comprising i) a positive electrode comprising an organosulfur compound which is capable of reversible formation of S—S bond upon oxidation and an electroactive compound selected from main group elements, and a current collector containing copper metal ii) a polymer electrolyte having lithium salt; and iii) a negative electrode made of lithium metal, lithium alloy or lithium intercalation compounds.

2. Description of Prior Art

Battery has a wide spectrum of applications as a key component of modern portable electronic devices. Especially, secondary battery is essential to the development of hand-arrying devices such as mobile telecommunication tools and notebook computers. A series of development of nickel-cadmium, nickel-metal hydride, and lithium ion types has provided advantages in reducing the size and weight of secondary battery. However, the rapid advancement of electronic technology and widespread use of portable devices has been continuously demanding the next generation battery which has higher capacity than existing systems.

The secondary battery using organosulfur compound as a positive electrode material has been disclosed in U.S. Pat. No. 4,833,048. In this patent, the sulfur-sulfur bond of organic disulfide compound consisting of positive electrode is cleaved by electrolytic reduction to form organic thiolate and disulfide bond is regenerated by electrolytic oxidation of organic thiolate. Especially, in case of two or more thiolate groups present in a molecule, formation of disulfide bond leads to polymeric form of organic disulfide compound. The redox couple of organic disulfide and organic thiolate accounts for theoretical energy density of 350 to 800 Wh/kg in combination with metal negative electrode. A rechargeable metal-organosulfur battery described in the invention provides practical energy density of 150 Wh/kg which is higher than that of conventional secondary battery.

To increase the practical capacity of organic disulfide electrode, U.S. Pat. No. 5,324,599 suggested the addition of $\pi$ electron conjugated conductive polymer such as polyaniline to cathodic composition containing organic disulfide. According to the report of same inventors disclosed in *Nature*, 373, 598(1995), the electron transfer of organic disulfide was catalytically accelerated in the presence of polyaniline. Accordingly, the composite electrode from organic disulfide and polyaniline mixed together in molecular level shows the enhanced energy density in excess of 600 Wh/kg when coupled with lithium metal as negative electrode. However, in order to maintain the high energy density, the cell required charging voltage up to 4.75 V, which is too high to ensure the electrochemical stability of cell components such as polymeric electrolyte and other organic parts. Lower charging potential which is practically required results in the decline of energy density of the cell.

In order to increase the cycle life of organic disulfide electrode, approaches to immobilize organic disulfide have been made since diffusive loss of soluble form of organic disulfide, such as mercaptan or thiolate, eventually results in the deterioration of capacity over the repeated cycle of charge and discharge. Addition of metallic compound such as copper, or silver which have binding affinity to organic disulfide species was disclosed in U.S. Pat. No. 5,665,492. Addition of copper ion to organic disulfide and employment of the resulted complex was described in Eur. Pat. No. 799,264, A2. Improvement of cycle life was also suggested in U.S. Pat. No. 5,516,598, in which metal salt of broad range of multivalent metallic complex of organic disulfide was used. In these disclosures, the role of metal as a coordinating center of sulfur containing ligand were described to improve the cycle life of organic disulfide electrode, but functions of metal such as redox reaction and activation of sulfur containing compound were not suggested. Consequently, above mentioned approaches provide only limited level of energy densities which represents at maximum the sole capability of organic disulfide.

Accordingly, the improvement for enhancing capacity and extended cycle life has yet to be realized to the secondary battery employing organosulfur compound as positive electrode material.

SUMMARY OF THE INVENTION

An object of the present invention is to provide a positive electrode with high capacity and good reversibility comprising 1) a positive electrode material comprising;
   i) an organosulfur compound which is capable of forming sulfur-sulfur bond by electrolytic oxidation and reversibly regenerated by reductive cleavage of sulfur-sulfur bond;
   ii) one or more electroactive components selected from the group consisting of main group elements, their alloys, their ionic salts, and combinations thereof; and
   iii) one or more electrically conductive ingredients selected from the group consisting of electrically conductive carbon and electrically conductive polymer; and
2) an electrically conductive current collector made of copper or copper alloy on which said positive electrode material is placed.

Preferred organosulfur compound has active functional group containing sulfur atom in which electrochemical activity is accompanied with the formation and cleavage of sulfur-sulfur bond upon electrolytic oxidation and reduction, respectively. The reductive cleavage of sulfur-sulfur bond leads to the generation of S–M bond (M is alkali metal, alkaline earth metal, transition metal or main group elements and includes proton) to form mercaptan or thiolate group.

Electroactive components of the composite electrode of present invention are selected from the group of main group elements and their alloys, their ionic salts, and their combinations. Of the main group elements, preferred are elements having multiple oxidation states, which include tin (Sn), selenium(Se), antimony(Sb) and arsenic(As).

Another object of the present invention is to provide a positive electrode in which said positive electrode material of the present invention is coupled with conductive current collector. Preferred conductive material for current collector is made of metal or metal alloy. More preferred conductive material for current collector is copper or copper alloy.

It is still another object of the present invention to provide an improved secondary battery having high energy density and good cycle life comprising i) a positive electrode selected from one of the positive electrodes described above
ii) a polymer electrolyte having lithium salt; and
iii) a negative electrode made of lithium metal, lithium alloy, or lithium intercalation materials selected from the group consisting of graphite, hard carbon, carbon fiber and polyacene.

DETAILED DESCRIPTION OF THE INVENTION

Figure 1:
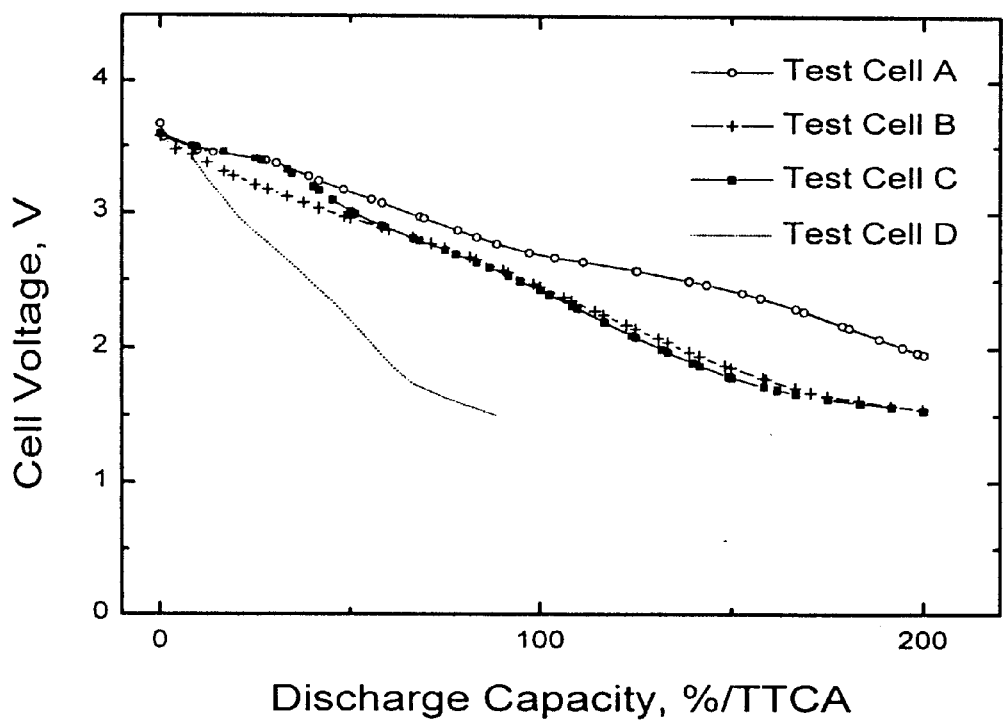
FIG. 1 compares the discharging profiles of test cells A, B, and C which contain tin, selenium, and antimony, respectively, in positive electrode with the test cell D of which positive electrode has organosulfur active material without main group elements.

A new type of positive electrode material containing organosulfur compound and main group elements has been developed. The positive electrode of the invention is combined with a suitable negative electrode such as lithium metal, lithium alloy, or lithium intercalating compounds like carbon and a suitable polymer electrolyte to provide a secondary battery with high capacity and extended cycle life.

The composite positive electrode material of the present invention contains main group elements as electroactive component participating in electrode reaction in addition to the organosulfur compound. Many of main group elements have amphoteric redox property. For example, antimony has −3 valence as well as +3 as stable oxidation state. Main group elements in the present invention have multiple oxidation states and undergo more than one redox reactions. When the battery is charged, positive electrode material of the invention is oxidized and when the battery discharged, in turn reduced. When oxidized main group elements become cation by oxidation, and when battery is discharged, the cation is converted to element, anion, or cation with lower oxidation state. The number of electrons involved in the redox process, which is the net change of oxidation states, directly relates to the capacity of the electrode. Selected elements of the present invention have high equivalent capacity as enhanced by the number of electrons involved in redox chemistry. If the redox couples of the elements of the invention are utilized for electrode reaction, electrochemical equivalent capacity is as high as 903 mAh/g for tin with valence change of four, 1,358 mAh/g for selenium with valence change of four, 660 mAh/g for antimony with valence change of three, and 1790 mAh/g for arsenic with valence change of five. (D. Linden Ed., Handbook of Batteries and Fuel Cells, McGraw-Hill, pp.C-3, 1984). Theoretical capacity is far above that of metal oxide electrodes used for conventional secondary lithium ion battery. Moreover, the elemental component activates the electron transfer reaction of organosulfur compound coexisting in electrode so that the high capacity of organosulfur electrode can be fully utilized. Furthermore, the interaction between sulfur atom contained in organosulfur compound and elemental species holds each other and prevents the loss of capacity caused by the diffusion of soluble forms of active material such as organic thiolate and ions from elemental components into electrolyte.

Positive electrode material of the invention contains organosulfur compound which is capable of forming sulfur-sulfur bond by electrolytic oxidation and reversibly regenerated by reductive cleavage of sulfur-sulfur bond. Examples of functional groups which are capable of forming sulfur-sulfur bond include mercaptan, thiolate, thioacid, thioester and thioketone. Formation of sulfur-sulfur bond takes place in intermolecular or intramolecular mode. Oxidation of an organosulfur compound which has a single functional group capable of forming sulfur-sulfur bond leads to formation of dimeric compound. If an organosulfur compound has two or more capable functional groups, a polymeric compound which has sulfur-sulfur linkage is generated. Regarding the organosulfur compound used for electrode material, an example includes disulfide compound represented by the formula of $(R(S)_y)_n$ which was disclosed in U.S. Pat. No. 4,833,048. This material can be represented by $R(SM)_y$ when reduced. In these formulas, R represents aromatic or aliphatic hydrocarbons; y is an integer from 1 to 6; and n is an integer of 2 or more. Examples of organic disulfide include 2,5-dimercapto-1,3,4-thiadiazole and trithiocyanuric acid. As another example of organic disulfide, the compound having two or more organic thiolate groups in a molecule and having capability of intramolecular formation of disulfide bond is included. An example of such compound is represented by 1,8-disulfide naphthalene as described in U.S. Pat. No. 5,324,599.

Positive electrode material of the invention contains electrically conductive ingredients such as carbon, or electrically conductive polymer. Electrically conductive carbon includes graphite and acetylene black. Among electrically conductive polymers used as conductive ingredients for electrode material, the compound having nitrogen or sulfur atom in the polymer skeleton or side chain is preferred. Interaction of nitrogen, oxygen or sulfur atom contained in the repeating units of conducting polymer with other active components, organosulfur compound and main group elements species, provides access of the active components to the conductive network and minimize the loss of active contents from the electrode. Further, accelerated electron transfer of organic disulfide in the presence of conducting polymer is described in *Nature*, 373, 598(1995). Examples of such conductive polymer include polyaniline, polypyrrole and polythiophene and their derivatives.

To prepare the electrode, binder material can be added. The polymer used as binder is preferably the same kind of polymer used for polymer electrolyte. However, a suitable polymer which is not ionically conductive can be also selected. In order to dissolve binder material, organic solvent, generally, aprotic solvent can be used. The elemental component is added in powder form and dispersed in the mixture of electrode material. The particle size of powder is preferably smaller than 50 $\mu$m. The preferred content of elemental part is 5~95 wt. % of total active components in electrode. The slurry of composite mixture is homogenized using suitable means such as magnetic stirring mechanical stirring, sonication, or ball milling.

The well dispersed composite electrode material is pasted on the conductive current collector. Preferred condutive material consisting current collector is copper metal. According to the present invention, the capacity of positive electrode is fully utilized by using current collector made of copper metal or copper alloy. The current collector made of copper metal maintains the stability of each components of the battery by preventing the excess elevation of charging potential by fixing the upper limit of voltage as the oxidation potential of copper metal.

According to the invention, a secondary battery with a said positive electrode is provided. Typical structure of the cell includes a said positive electrode of the invention, polymer electrolyte, and a negative electrode from lithium metal, lithium alloy or materials capable of lithium intercalations.

Applicable polymer electrolyte used for lithium secondary battery of the present invention is ion conductive polymer electrolyte capable of solvating lithium ion and can be prepared either in a solid type or in a gel type. Polymer electrolyte essentially consists of base polymer and lithium salt. Lithium salt can be selected from the group of $LiClO_4$, $LiBF_4$, $LiPF_6$, $LiAsF_6$, $LiAsCl_6$, $LiCF_3SO_3$, $LiN(SO_2CH_3)_2$ and their combinations. Base polymer suitable for application has a functional group containing hetero atom in repeating unit and has a certain degree of chemical affinity with lithium salt. Examples include poly(ethylene oxide), poly(propylene oxide), polyacrylonitrile, poly(acrylonitrile-co-methyl acrylate), poly(vinylidene fluroride), and poly(vinylidene fluoride-co-hexafluoropropylene). The content of lithium salt in polymer electrolyte is in the range of 5~50 mol % relative to monomer unit of base polymer. In order to plasticize polymer electrolyte, organic solvent can be added. The polar organic solvent having carbonate group, for example, one or combination of more from propylene carbonate, ethylene carbonate, dimethyl carbonate, diethyl carbonate and methyl ethyl carbonate can be used. The content of plasticizer is 10~90 wt. % of polymer electrolyte.

Negative electrode of the present invention is lithium metal or lithium alloy which is capable of lithium striping and plating upon charge and discharge. Another example of the negative electrode of the present invention is a group of materials which are capable of intercalations. Examples include carbon materials such as graphite, amorphous carbon, coke pitch, polyacene, etc. Upon charging the battery, lithium is intercalated into the carbon structure and lithium ion is, in turn, ejected from negative electrode when the battery is discharged.

Positive electrode of the invention provides high capacity and good reversibility, since the redox system of elemental components in combination with organosulfur compound is effectively utilized. Furthermore, the invention provides a rechargeable battery with light weight and high capacity, which is most advantageous in the application of portable electronic devices such as cellular phone or notebook computer. Further, since the lithium secondary battery of the present invention consists of all solid components, it dose not raise any problems relating to the use of liquid such as leakage or pressure development and can be easily fabricated in a suitable shape according to the various application purpose of battery.

The present invention can be explained more concretely by following examples. However, the scope of the present invention shall not be limited to these examples.

EXAMPLE I

Preparation of Polymer Electrolyte

To a mixed solvent of propylene carbonate and ethylene carbonate(10.5:7.9 wt./wt.), 3.0 g of poly(acrylonitrile-co-methyl acrylate)(94:6) and 2.3 g of lithium tetrafluoroborate were added. The mixture was heated at 120~140° C. under a nitrogen atmosphere. Then, the clear solution of polymer electrolyte was cast on glass plate, and dried at 60~80° C. under vacuum. The ionic conductivity of resulted electrolyte film was $10^{-3}$~$10^{-4}$ S/cm by impedance measurement.

EXAMPLE II

To a solution of 1.5 g of 1, 3, 5-trithiocyanuric acid (TTCA), 0.4 g of poly(vinylidene fluoride), 1.6 g of polyaniline(Versicon, Allied Signal Inc.), and 0.1 g of Brij35 in 20 mL of N-Methyl-2-pyrrolidone were added 0.6 g of tin powder (particle size <50 $\mu$m), and 0.7 g of acetylene black. The mixture was stirred for two days. The resulted slurry was pasted on copper metal sheet under an argon atmosphere. The electrode was dried at 60~80° C. under vacuum and pressed under pressure of 0.1~3 ton/cm². The test cell A was prepared by combining the electrode and a negative electrode from lithium metal foil with nickel mesh current collector and gel polymer electrolyte layer which was prepared according to example I.

Comparative Example I

Test cell A' was prepared in the same manner as example II except that graphite sheet was used instead of copper metal sheet as a current collector of positive electrode.

EXAMPLE III

To a solution of 1.5 g of TTCA, 0.4 g of poly(vinylidene fluoride), and 1.5 g of polyaniline(Versicon, Allied Signal Inc.) in 20 mL of N-Methyl-2-pyrrolidone were added 0.6 g of selenium powder (particle size <50 $\mu$m), 0.4 g of acetylene black and 0.3 g of graphite. The mixture was stirred for two days. The resulted slurry was pasted on copper metal sheet under an argon atmosphere. The electrode was dried at 60~80° C. under vacuum and pressed under pressure of 0.1~3 ton/cm². The test cell A' was prepared by combining the electrode and a negative electrode from lithium metal foil with nickel mesh current collector and gel polymer electrolyte layer which was prepared according to example I.

COMPARATIVE EXAMPLE II

Test cell B' was prepared in the same manner as example III except that graphite sheet was used instead of copper metal sheet as a current collector of positive electrode.

EXAMPLE IV

To a solution of 1.2 g of TTCA, 0.4 g of poly(vinylidene fluoride), 1.5 g of polyaniline(Versicon, Allied Signal Inc.) in 20 mL of N-Methyl-2-pyrrolidone were added 0.5 g of antimony powder (particle size, 1~10 $\mu$m) and 0.7 g of acetylene black. The mixture was used to prepare the test cell C in the same manner as example The mixture was stirred for two days. The resulted slurry was pasted on copper metal sheet under an argon atmosphere. The electrode was dried at 60~80° C. under vacuum and pressed under pressure of 0.1~3 ton/cm². The test cell A was prepared by combining the electrode and a negative electrode from lithium metal foil with nickel mesh current collector and gel polymer electrolyte layer which was prepared according to example I.

COMPARATIVE EXAMPLE III

Test cell D was prepared according to the procedure in example II without tin in the positive electrode. Thus, 1.0 g of TTCA, 0.4 g of poly(vinylidene fluoride), 0.1 g of Brij35 were dissolved in 20 mL of N-Methyl-2-pyrrolidone. And then, 0.4 g of acetylene black and 0.3 g of graphite were added. The mixture was used to prepare the test cell D in the same manner as example II.

Evaluation of the Test Cells

Figure 2:
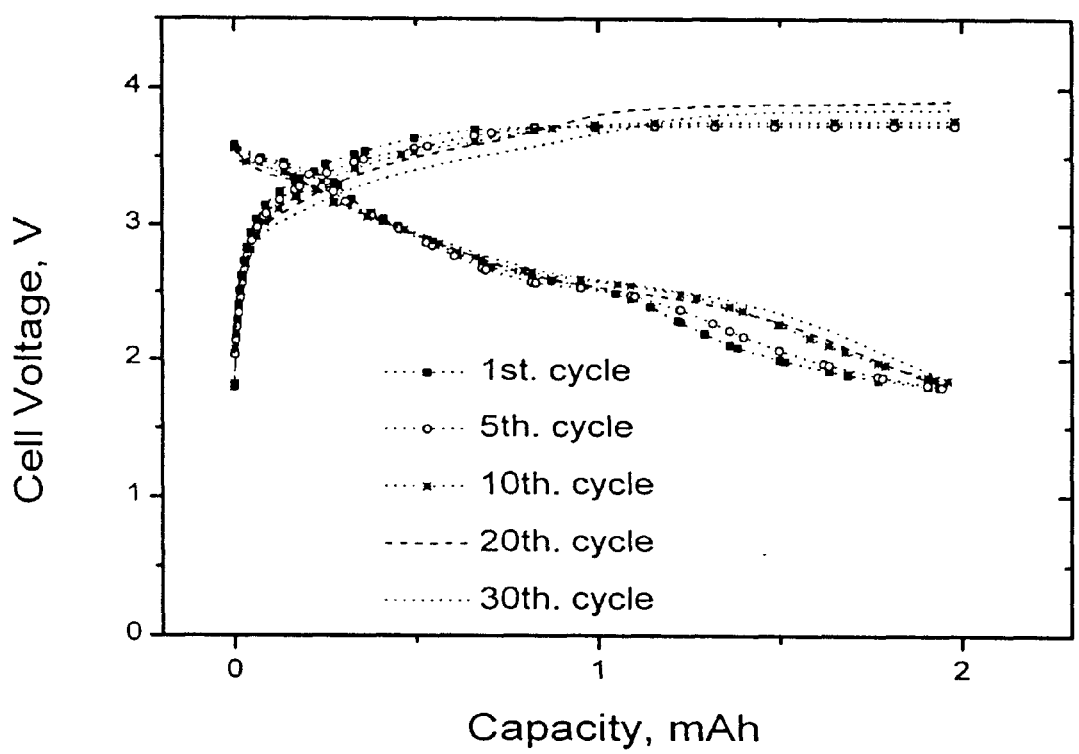
FIG. 2 shows multiple overlay of the charge-discharge profiles of test cell A according to the number of cycle.
Figure 3:
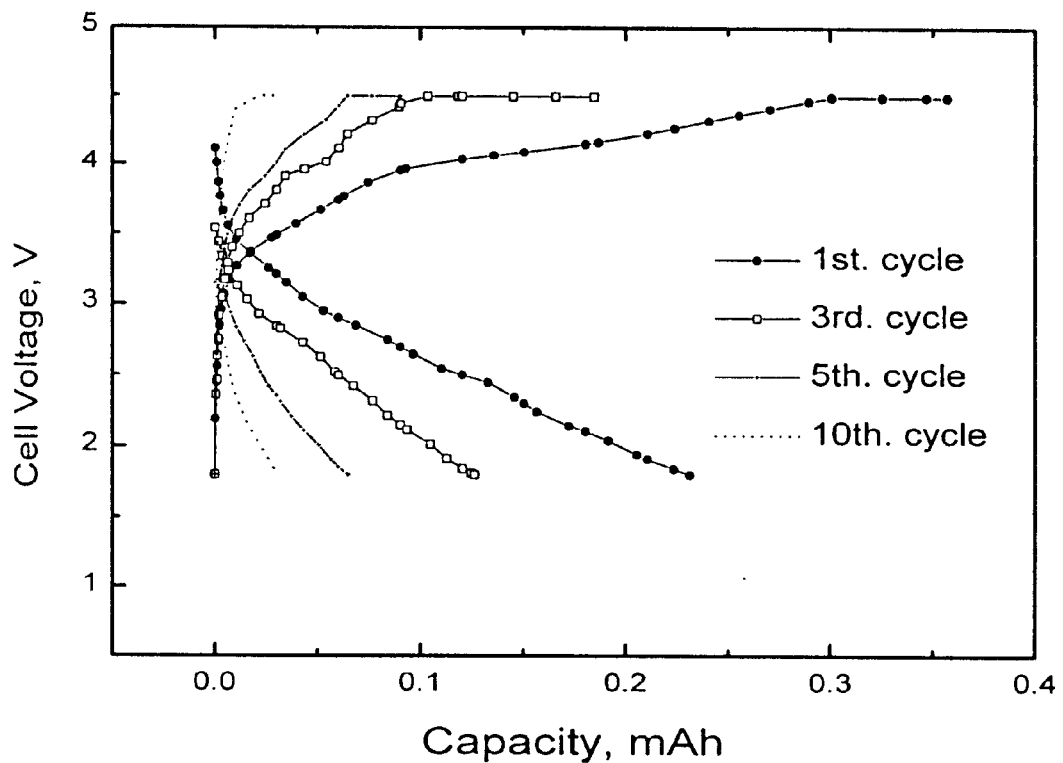
FIG. 3 shows the variation of the charge-discharge profiles of test cell A' which has graphite as current collector according to the number of cycle.
Figure 4:
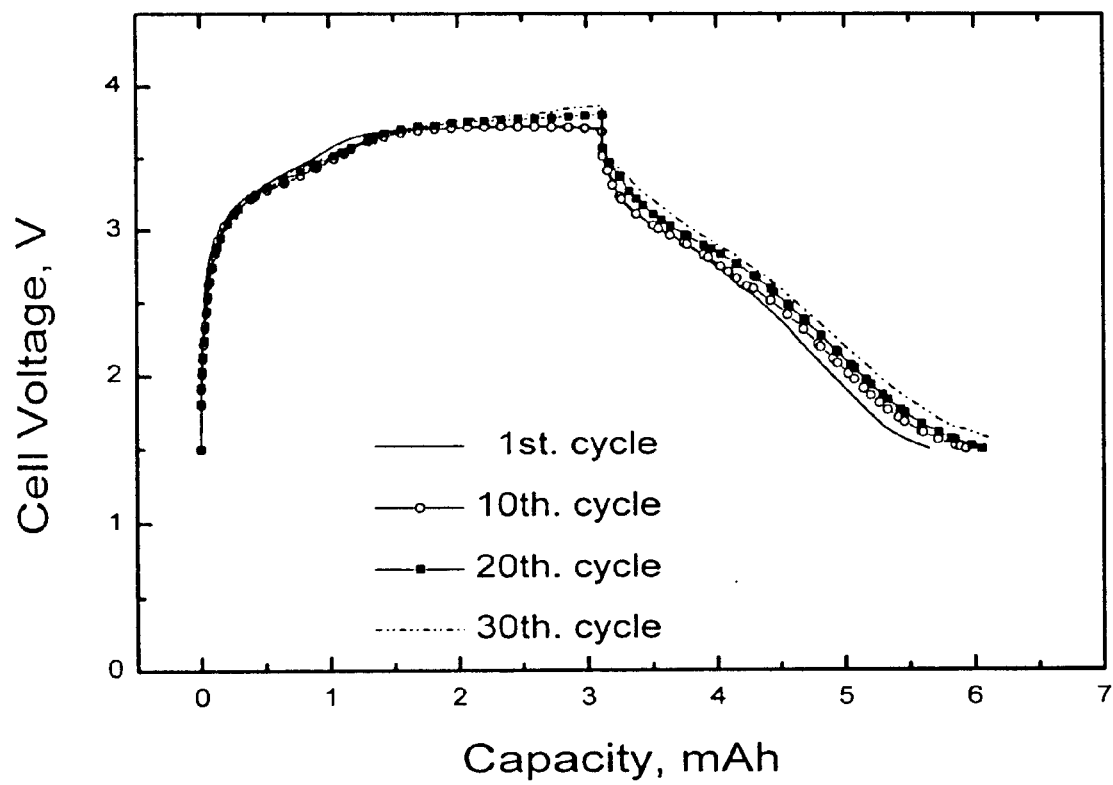
FIG. 4 shows multiple overlay of the charge-discharge profiles of test cell B according to the number of cycle.
Figure 5:
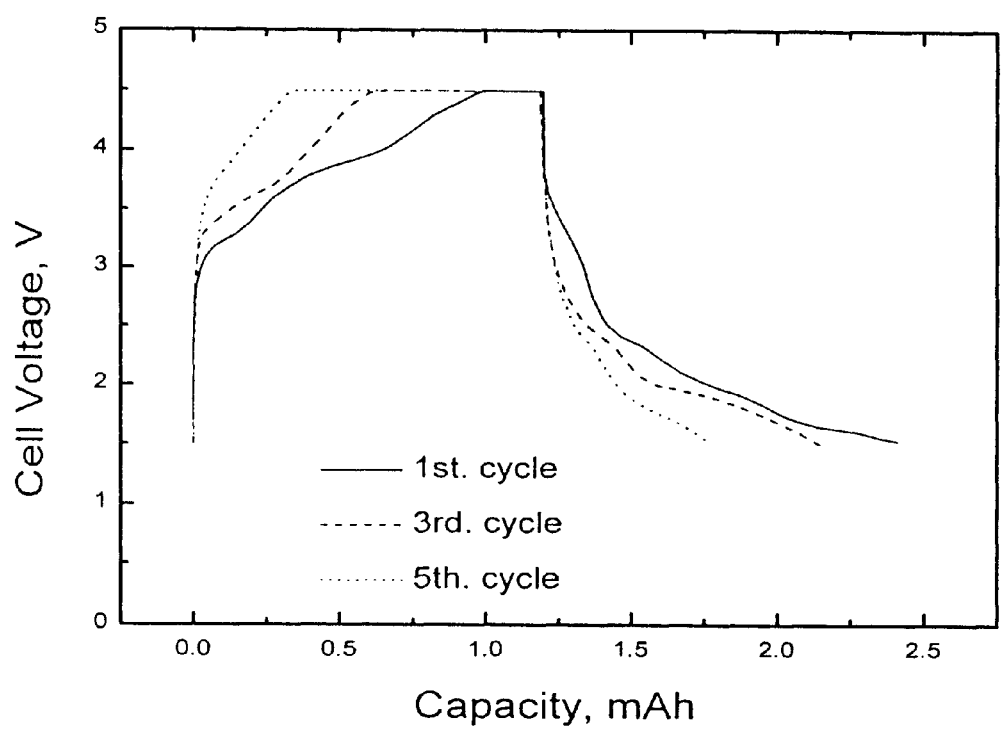
FIG. 5 shows the variation of discharging profile of test cell B' which has graphite as current colletor according to the number of cycle.

Charging and discharging test was galvanostatically carried out using test cells A~D and A'~B'. In FIG. 1, the discharge capacities of test cell A, B, and C which contains tin, selenium, and antimony, respectively, in addition to TTCA are shown as the percentile ratio to the estimated capacity of TTCA contained in the electrode. Capacities of the test cells A, B, and C are well beyond the theorecical expectation of TTCA based on the content in the positive electrode. Moreover, the direct comparison with the test cell D which has only TTCA as active component in the positive electrode demonstrates the high capacity of the composite electrode containing main group elements of the invention. It indicates that metallic components contained in positive electrode actively participates in electrode reaction and contributes to the capacity of the electrode. FIGS. 2 and 4 illustrate the stable and reproduceble cycling behavior of composite electrode containing organosulfur and main group elements as active components in positive electrode. Charging and discharging profiles reflects the more or less reproducible electrochemical response during 25 cycles. FIGS. 3 and 5 show the charge and discharge profiles of test cell A' and B' which has the same composition of positive electrode material as test cell A and B, but with current collector made of graphite instead of copper metal. Charging potential in both cells rapidly increases from the initial cycles and discharging capacity accordingly decreases. The comparison of FIGS. 2 and 4 with FIGS. 3 and 5 indicates that the composite positive electrode having current collector made of copper metal provides better stability and consequently ensures higher capacity. From the results demonstrated by the above examples, it is clearly shown that the positive electrode prepared following the present invention provides high energy density and good reversibility for secondary battery.

What is claimed is:

1. A positive electrode used for secondary battery comprising;
    1) a positive electrode material comprising;
        i) an organosulfur compound which is capable of forming sulfur-sulfur bond by electrolytic oxidation and reversibly regenerated by reductive cleavage of sulfur-sulfur bond;
        ii) one or more cathode active components having multiple oxidation states which undergoes oxidation when the battery is charged and reduction when the battery is discharged, wherein the active components are selected from the group consisting of tin(Sn), selenium(Se), antimony(Sb), arsenic(As), their alloys, their ionic salts and combinations thereof; and
        iii) one or more electrically conductive ingredients are selected from the group consisting of conductive carbon and electrically conductive polymer; and
    2) an electrically conductive current collector made of copper or copper alloy on which said positive electrode material is placed.

2. The positive electrode used for secondary battery according to the claim 1, wherein the organosulfur compound comprises one or more thiolate or mercaptan functional groups.

3. The positive electrode used for secondary battery according to the claim 2, wherein the organosulfur compound is selected from the group consisting of 2,5-dimercapto-1,3,4-thiadiazole and trithiocyanuric acid.

4. The positive electrode used for secondary battery according to the claim 1, wherein one or more electrically conductive ingredients are selected from the group consisting of graphite, acetylene black, and a conductive polymer having nitrogen oxygen, or sulfur on its repeating unit.

5. The positive electrode used for secondary battery according to the claim 4 wherein a conductive polymer is selected from the group consisting of polyaniline, polythiophene and polypyrrole.

6. An improved secondary battery having high energy density and good reversibility comprising;
    i) a positive electrode prepared according to claim 1;
    ii) a solid polymer electrolyte having lithium salt; and
    iii) a negative electrode made of lithium metal, lithium alloy, or lithium intercalation materials selected from the group consisting of graphite, hard carbon, carbon fiber and polyacene.

* * * * *